United States Patent [19]

Miekka

[11] Patent Number: 5,788,007
[45] Date of Patent: Aug. 4, 1998

[54] ELECTROMAGNET VEHICLE DRIVE

[76] Inventor: Fred N. Miekka, 234 San Gabriel Ct., Sierra Madre, Calif. 91024

[21] Appl. No.: 610,115

[22] Filed: Feb. 29, 1996

Related U.S. Application Data

[63] Continuation-in-part of Ser. No. 314,778, Sep. 29, 1994, abandoned.

[51] Int. Cl.$^6$ .................................................. B60K 1/00
[52] U.S. Cl. .................................... 180/205; 180/220
[58] Field of Search .................................. 180/205, 206, 180/214, 220, 65.1, 65.2; 324/174, 175

[56] References Cited

U.S. PATENT DOCUMENTS

| | | | |
|---|---|---|---|
| 3,884,317 | 5/1975 | Kinzel | 180/220 |
| 4,062,421 | 12/1977 | Weber | 180/65.1 |
| 4,095,663 | 6/1978 | Gaffney | 180/205 |
| 4,855,712 | 8/1989 | Wiley, Jr. et al. | 340/453 |

FOREIGN PATENT DOCUMENTS

| 297796 | 1/1992 | Germany | 180/205 |
|---|---|---|---|

*Primary Examiner*—Kevin Hurley
*Attorney, Agent, or Firm*—Oppenheimer Wolff & Donnelly LLP

[57] ABSTRACT

A working geometry is provided between an electromagnet and permanent magnet, and a method for using such geometry is also provided which allows for electrically driving the wheel of a vehicle such as a bicycle with enough power to eliminate the need for pedalling. A system for electrically propelling a bicycle or other vehicle by placing permanent magnets on or adjacent the rim of the wheel or wheels, and having one or more electromagnets placed adjacent to them to drive the wheel. The electromagnet or electromagnets may be U-shaped with opposite end poles of each electromagnet extending close to the permanent magnets on opposite sides of the wheel. A sensor such as a reed switch or Hall effect device is used to sense the position of the magnets and properly time pulses of electricity into the electromagnet thus driving the wheel. A transistor interface between the sensor and drive electromagnet allows for driving the wheel without the wear normally associated with brushes. Successive permanent magnets mounted on the wheel are preferably oppositely poled to facilitate higher efficiency force application between the electromagnet or electromagnets and the permanent magnets.

21 Claims, 6 Drawing Sheets

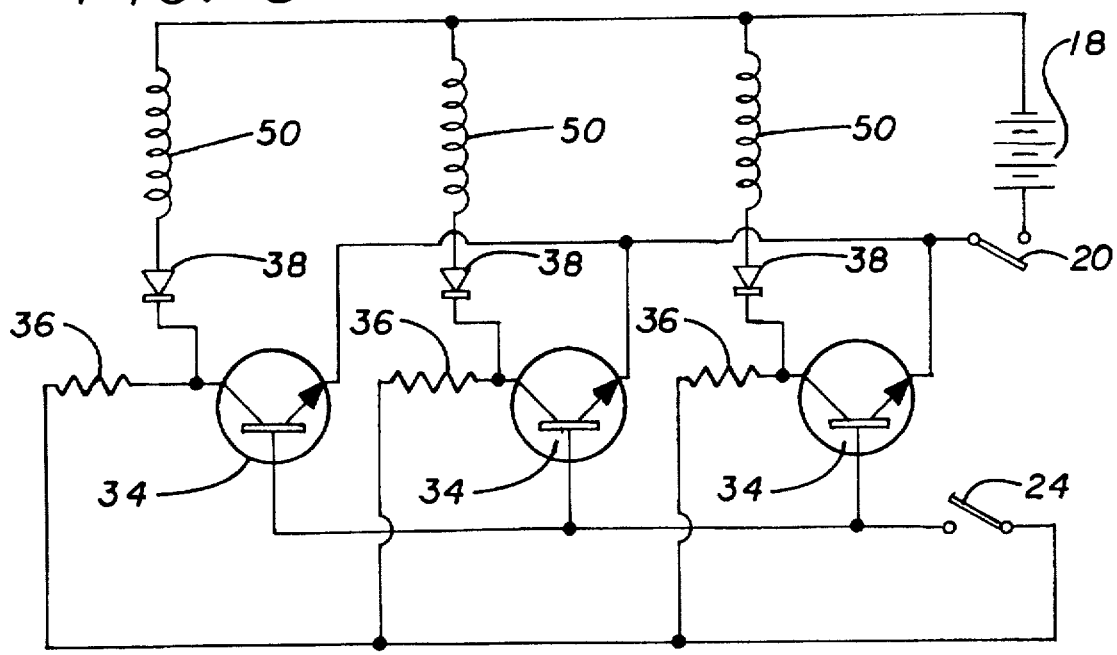
FIG. 8
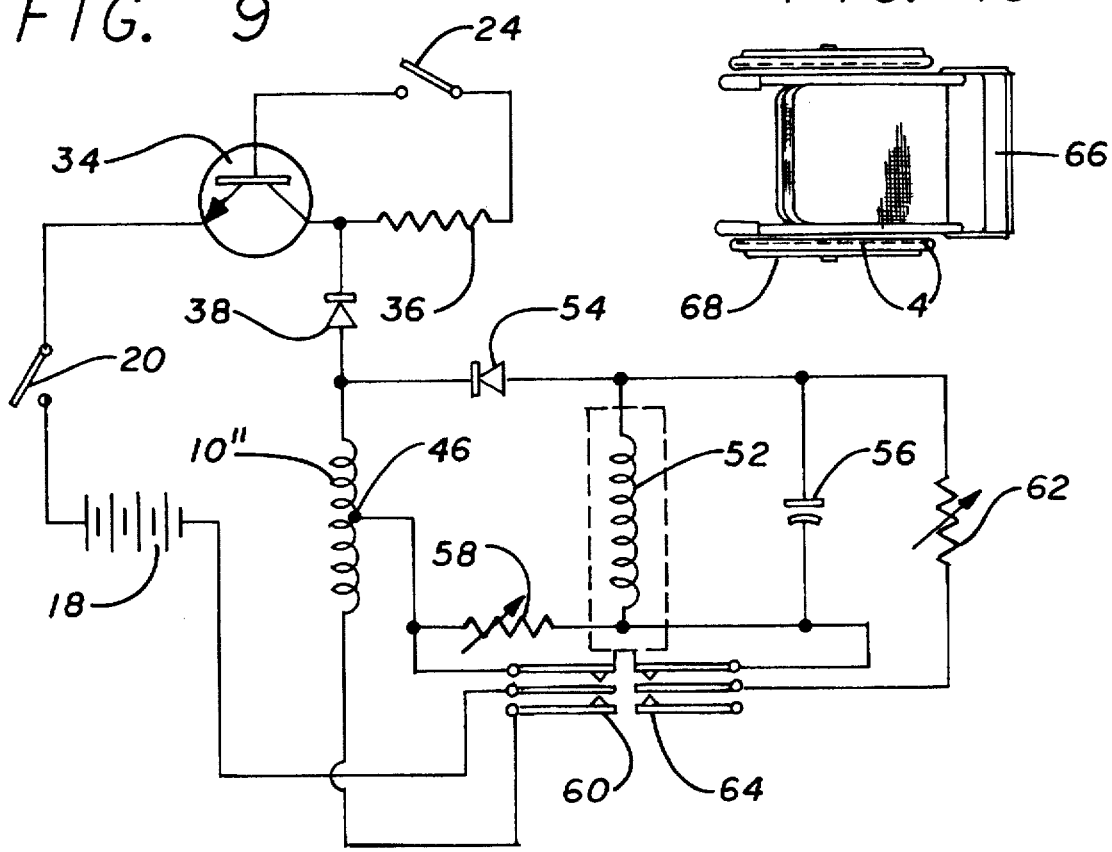
FIG. 9
FIG. 10

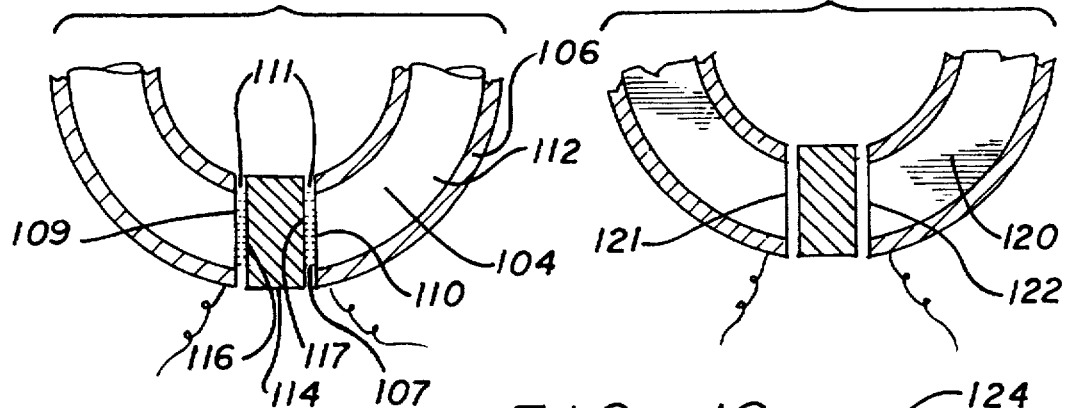
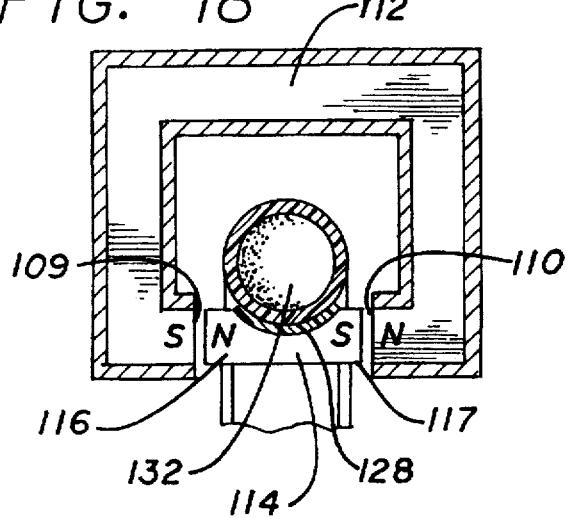
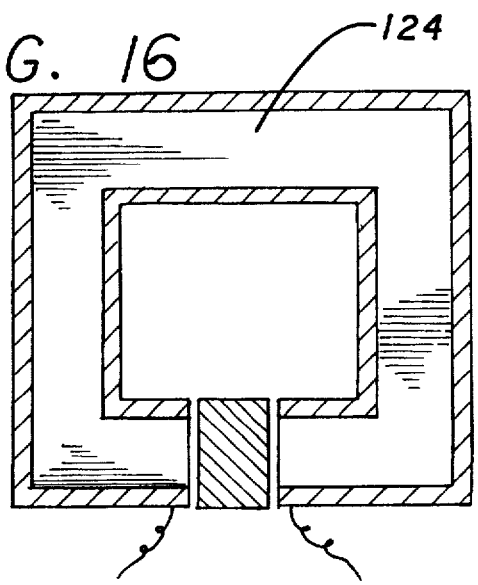
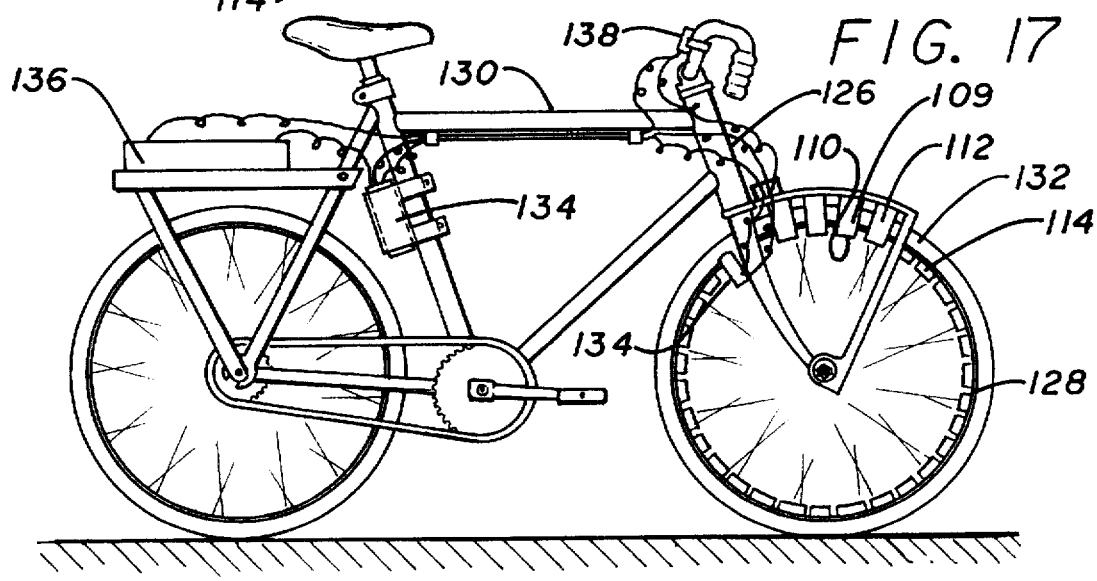

ELECTROMAGNET VEHICLE DRIVE

RELATED APPLICATIONS

This is a continuation in part of U.S. patent application 08/314,778, filed Sept. 29, 1994 now abandoned.

BACKGROUND OF THE INVENTION

This invention relates to electric vehicles, and more particularly to electric bicycles. There are numerous methods available to provide a power assist to augment the use of pedalling a bicycle. One of the easiest ways to assist a bicycle is by utilizing a small D.C. electric motor to drive one of the wheels by friction. One such system is called "The Chronos Hammer." The entire system weighs only 5.7 pounds. Its light weight can be attributed to the fact that it is meant to assist rather than replace pedalling. Because of its light weight, it adds little extra effort for the bicyclist when the drive mechanism is not engaged.

An improved system for augmenting pedalling is disclosed in U.S. Pat. No. 4,062,421. In this patent one or more small permanent magnets are fastened to fixtures and bolted onto the inside of the rim of one or more of the wheels. Two small electromagnets are employed, one on each side of the wheel, each with closely spaced poles extending toward the magnets mounted on the wheel. Sensors are used to properly time pulses of electricity into the electromagnets to assist the rider. The drive system is connected to an activation switch which only turns on the assist when the pedals are moving. The geometry used provides inadequate electromagnet core lengths to provide enough power to eliminate the need for pedalling, and the geometry, with closely spaced pole pieces, is relatively inefficient, with the force from one pole of each electromagnet acting in partial opposition to the other pole.

There are several systems available to replace rather than to augment pedalling. One of the easiest ways to accomplish this is to use a system similar to the friction assist "Hammer" system but with a bigger motor which is capable of putting out at least ¼ horsepower, and preferably one half of a horsepower. As in the "Hammer" system, this involves having an electric motor with a shaft which can engage one of the pneumatic tires by way of contact. Although simple and relatively straight forward, these drives suffer from several disadvantages, namely the following:

1. Much of loss of mechanical energy occurs in deforming the tire and in slippage.
2. Severe slippage in wet weather.
3. Excess tire wear.
4. Fairly large motors are required to propel the bicycle since much mechanical energy is lost to the friction drive.

Drive systems capable of replacement of pedalling do exist which do not utilize friction drives. An example of this is U.S. Pat. No. 4,168,758. In this system, an electric motor is used to drive the chain of a bicycle via a sprocket. A motor control circuit controls the drive motor. Unfortunately since the chain is directly driven by the motor, the annoyance of rotating pedals always occurs while the motor is in the drive mode.

An improvement on this is U.S. Pat. No. 4,541,500. In this patent, separate drive chains are utilized with a clutch to engage and disengage the drive. Unfortunately, this system suffers from complications in the drive train and results in excess weight and mechanical losses.

Other systems utilize inside of the hub drive. These systems make the hub of the drive wheel itself the electric motor. These systems have the advantage of eliminating the high losses and slippage in friction drive systems and eliminate interference with pedaling in chain drive systems. This allows the bicyclist to pedal independently of the drive train. An example of this is U.S. Pat. No. 4,346,777, in which a discoid electric motor is fitted into the hub. The central axle is the stator, and a kinematic transmission used to properly utilize the power. The transmission is needed because an unusually high amount of torque is needed to drive the wheel from the center. Unfortunately, this adds complication, mechanical losses, and cost to the system. Another hub drive system is outlined in U.S. Pat. No. 2,179,418, in which gears are used along with a disengagement set up to keep the geared motor from inadvertently slowing down the bicycle in the non drive mode.

U.S. Pat. No. 3,884,317 partially solves this problem by expanding the hub to near the edge of the wheel to minimize the torque needed to drive the wheel. Unfortunately, this leads to difficulties associated with totally redesigning the wheel, and an inability to use standard wheel bearings. Also a split rim had to be designed for maintenance purposes. This design also introduces a large amount of undesirable inertial mass to the system since the majority of the weight is located at the edge of the wheel where the highest velocity occurs.

Hub drive systems suffer from complicated drive mechanisms some of which posses considerable mechanical losses. Hub drive systems also present difficulty in both building as well as repairing since they tend to be fairly complicated. These systems as well as traditional electric motors also suffer from the possibility of water being trapped within their inner workings following exposure to wet weather.

It is an object of this invention to provide an electrically powered bicycle which is capable of propelling itself and rider on level ground or up hills without the need for pedalling.

It is a further object of this invention to provide a drive system without mechanical losses.

It is a further object of this invention to provide an efficient means of recharging the batteries when going down hill to extend the range of the vehicle.

It is a further object of this invention to expose the electromagnet windings directly to the stream of moving air around the bicycle to maximize cooling. This allows for higher output power and reduces resistive losses associated with overheated windings.

It is a further object of this invention to provide an efficient means of speed control.

Finally, it is an object of this invention to allow for repeated and prolonged exposure to wet weather without damage to the system.

SUMMARY OF THE INVENTION

This present invention therefore proposes mounting permanent magnets against the rim of one or more of the wheels in a vehicle such as a bicycle, and having one or more electromagnets mounted to the frame and located close enough to the path of the permanent magnets to electrically drive the wheel with enough force to eliminate the need for pedalling. A sensor such as a Hall effect unit senses the positions of the magnets relative to the electromagnets, and applies appropriately timed pulses of electricity to a transistor interface. The transistor interface amplifies the pulses from the sensor and inputs them into the electromagnet or electromagnets. Each electromagnet consists of an iron ring wrapped with wire which is provided with a slot. The tire and rim assembly travel through the center of the ring with their attached permanent magnets traveling through the slot. The successive permanent magnets are preferably oppositely polarized, so that cumulative pushing and pulling forces are generated.

As a supplemental feature of the invention, circuitry is provided for recharging batteries, while the bicycle is coasting down hill or stopping.

BRIEF DESCRIPTION OF THE DRAWINGS

FIG. 8 shows a circuit diagram for driving a three coil electromagnet in the pull only mode.

FIG. 9 shows a circuit diagram for operating a variable inductance electromagnet in the pull only mode wherein a relay switch is used to automatically change the drive inductance when needed.

FIG. 10 shows the top view of a wheel chair set up for air gap drive.

FIG. 14 shows a Rowland ring with a slot and a permanent magnet located in this slot in its equilibrium position.

FIG. 15 shows a Rowland ring with a slot having rectangular pole faces.

FIG. 16 shows a Rowland ring with a slot, and which has been further modified by having outside dimensions which are rectangular in order to facilitate mounting to a bicycle frame.

FIG. 17 shows a fully operational electric bicycle utilizing the improved drive system of this invention.

FIG. 18 shows a cross sectional view of the "modified Rowland ring" electromagnet driving the wheel by interaction with the permanent magnets.

DETAILED DESCRIPTION OF THE PREFERRED EMBODIMENT

Figure 1:
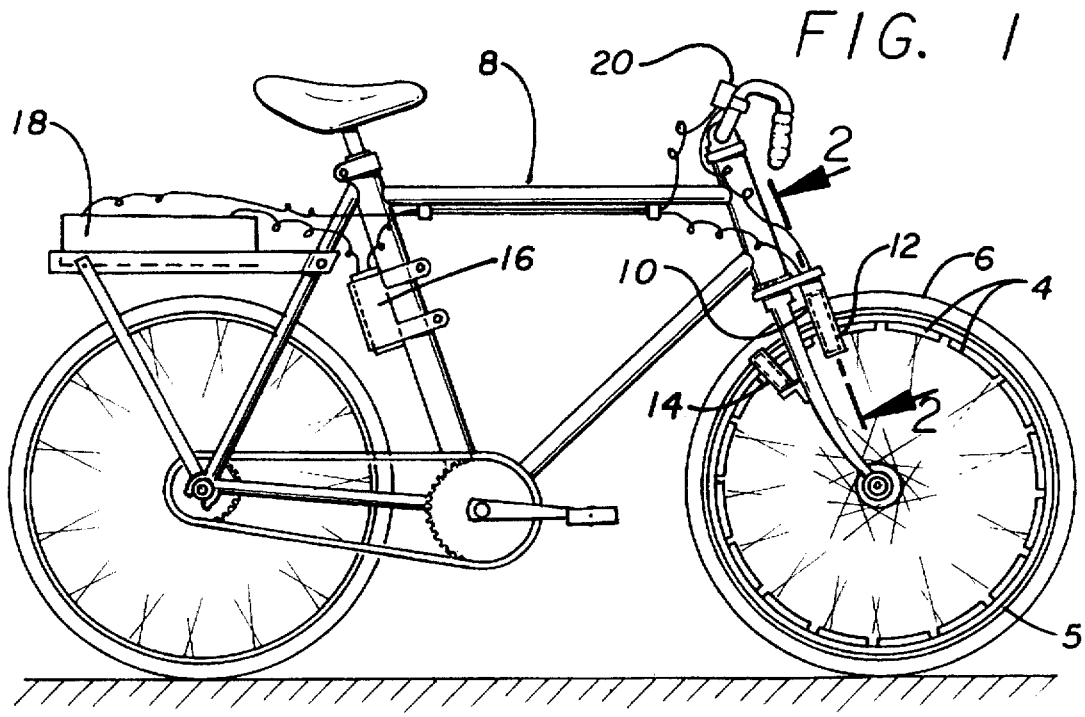
FIG. 1 shows a fully operational electric bicycle utilizing the principle of air gap magnetic drive.

Referring to FIG. 1, a bicycle 2 is constructed with permanent magnets 4 mounted between the spokes and into the rim 5 of the drive wheel (front wheel in this diagram) 6. Located on the frame 8 of the bicycle 2 are mounted at least one "U-shaped" or "C-shaped" electromagnet 10 with its poles 12 coming close to but not touching the path of the permanent magnets in the wheel. Further employed is at least one sensor 14 which could be a reed switch, a Hall effect sensor, a photocell gate, or any other means to sense the magnet position. The sensor is interfaced via a semiconductor circuit 16 to a set of batteries 18. A switch 20 in series with the batteries activates the drive mechanism.

Figure 2:
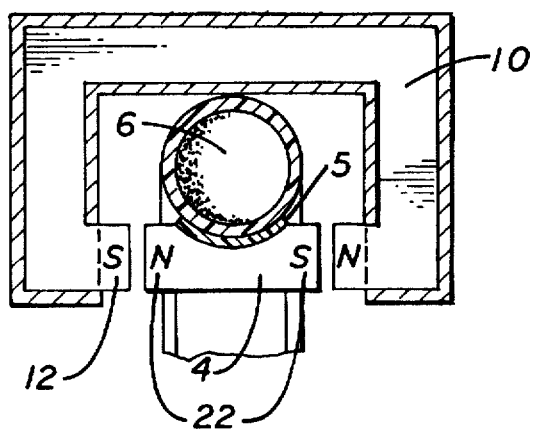
FIG. 2 shows a cross sectional view of the "U-shaped" electromagnet driving the wheel by pulling the permanent magnet into the field.
Figure 3:
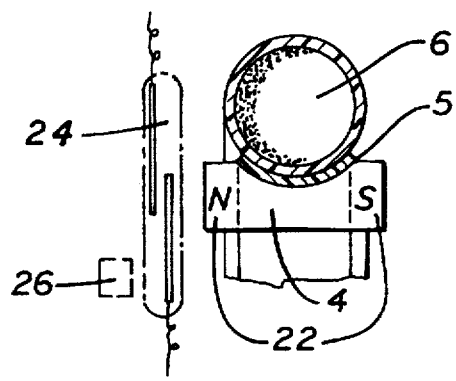
FIG. 3 shows a reed switch being used to sense the position of the permanent magnet.
Figure 4:
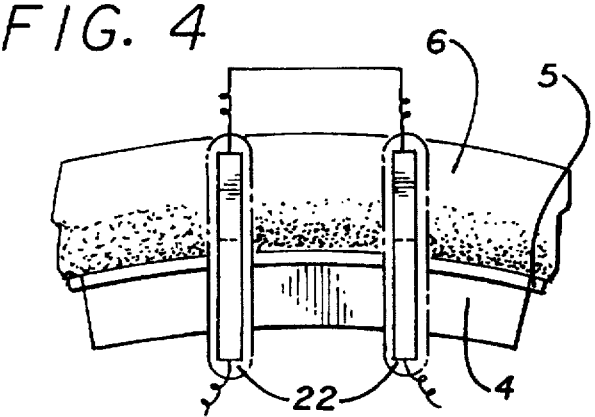
FIG. 4 shows two reed switches wired in series and separated by some distance to adjusted the activation dwell time.

The drive mechanism itself is illustrated in FIG. 2 which shows a cut away view of a magnet 4 in rim 5 of the wheel 6 being pulled by "U-shaped" electromagnet 10. The pull cycle is illustrated by virtue of permanent magnet poles 22 being opposite in sign to the "U-shaped" electromagnet poles 12. FIG. 3 illustrates the use of a reed switch sensor. In this illustration permanent magnet 4 in rim 5 of the wheel 6 activates a reed switch 24 when the poles 22 of the permanent magnets approach the reed switch. The reed switch can be used as is to sense the presence of a magnetic field; or it can be used with a proximate magnet 26 to sense one pole more strongly than the other. Another modification that can be made to the reed switch sensor is illustrated in FIG. 4. FIG. 4 shows the side view section of bicycle wheel 6 with rim 5 mounted with a permanent magnet 4. Two reed switches 24 are wired in series so that no current can flow unless both reed switches are activated at the same time. Separating the two reed switches reduces the activation time per magnet. The greater the separation, the less will be the dwell time when both switches are activated at the same time.

The electromagnet 10 is activated just before one of the permanent magnets 4 reaches the electromagnet to pull it forward; and the electromagnet is turned off just as the permanent magnet arrives.

Figure 5:
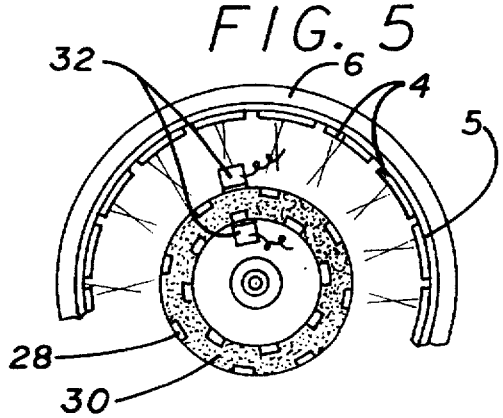
FIG. 5 shows a wheel mounted with permanent magnets and a photo cell gate sensor used to time the drive.

An alternative to reed switch sensing involves the use of photo cell gates. FIG. 5 shows a bicycle wheel 6 with permanent magnets 4 mounted to rim 5. Also shown is a plastic light control disk 28 with optical imaging arrangements 30. Photo cell gates 32 sense the light from a light-emitting dial (LED) through the transparent portions of the disk and convert it to a signal that is used to time the circuit.

Figure 6:
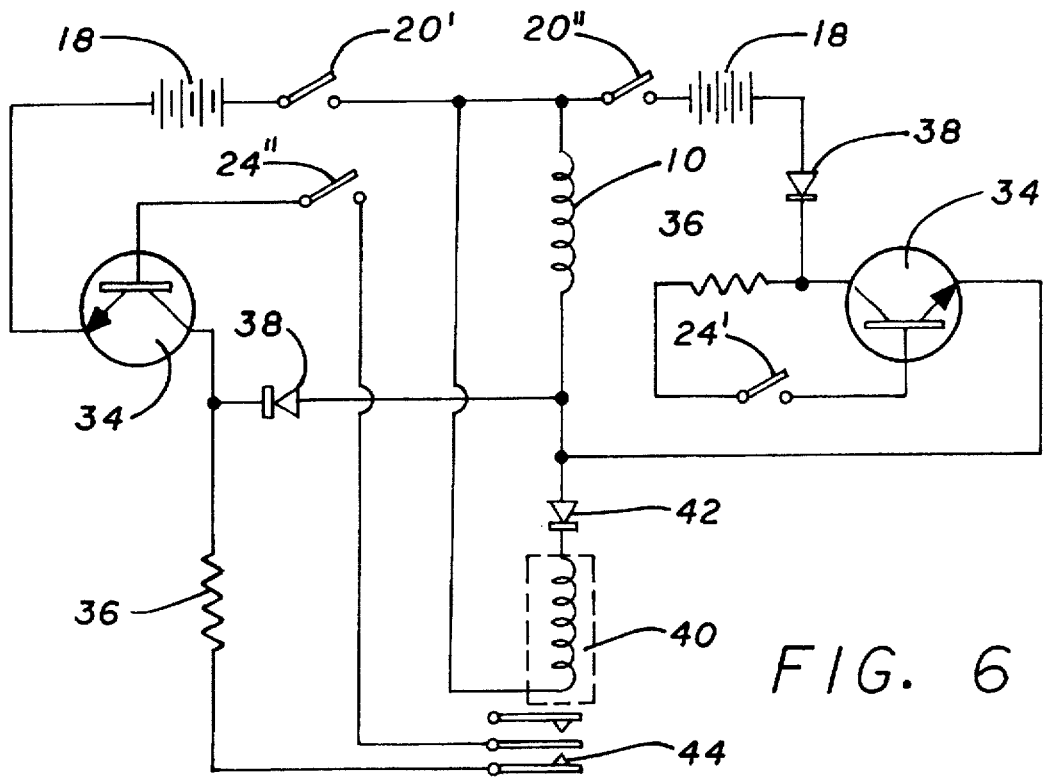
FIG. 6 shows a schematic circuit diagram for driving a single coil electromagnet in both the pull and push cycle modes.

FIG. 6 shows a circuit diagram for powering a "U-shaped" electromagnet in both the push and pull modes. In this diagram power from batteries 18 is available to "U-shaped" electromagnet 10 when switches 20' and 20" are closed. Power transistors 34 are turned on and power to the "U-shaped" electromagnet 10 will flow when each transistor is activated. The base collector circuit is activated by reed switches 24' and 24" closing the base collector circuit through current biasing resistors 36. Protecting diode 38 prevents transient back EMF pulses from the "U-shaped" electromagnet 10 from damaging transistors 34. A low voltage relay 40 is wired with a polarity sensing diode 42 to turn it on when one particular circuit is activated but not the other. Relay contacts 44 are wired in series with the input of transistor 34 of the other circuit. This relay prevents both circuits from being inadvertently activated at the same time which if it occurred, would cause a dead short across both transistors.

A working geometry is provided between an electromagnet and permanent magnet, and a method for using such geometry is also provided which allows for electrically driving the wheel of a vehicle such as a bicycle with enough power to eliminate the need for pedalling.

Figure 7:
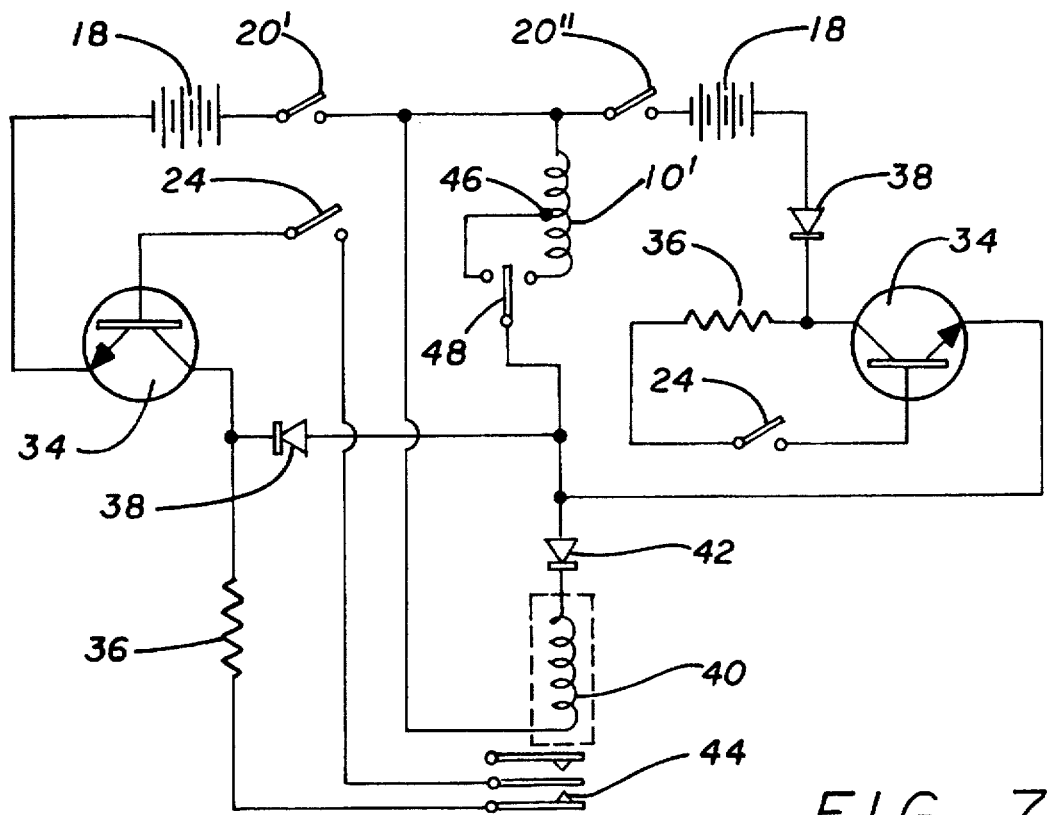
FIG. 7 shows a schematic circuit diagram for driving a single coil electromagnet in both the pull and push cycle modes wherein the electromagnet coil has a center tap, and a SPDT switch is used to change the inductance to vary the speed.

FIG. 7 illustrates an efficient speed control formed by adding a center tap 46 to the coil of the "U-shaped" electromagnet 10'. A SPDT (Single Pole Double Throw) switch 48 can be used to switch from the center tap to the entire coil length. This changes the inductance of "U-shaped" electromagnet 10'. In addition to center taps, other ways to modify the inductance of the "U-shaped" electromagnet include winding several separate coils on one magnetic core. FIG. 8 illustrates this arrangement. Coils 50 are all wound on a single iron core to make a single "U-shaped" electromagnet. Each separate coil is wired to its own transistor 34. Protecting diodes 38 protect transistors 34 from back EMF pulses from coils 50. A single reed switch 24 can be used to activate all three transistors via current biasing resistors 36. Power switch 20 activates the circuit. This circuit is best used for the pull only mode since this does not run the risk of demagnetizing the permanent magnets in the wheel.

FIG. 9 shows a circuit that can be used to automatically change the inductance of the "U-shaped" electromagnet when needed without the operator having to actuate a switch. A single coil "U-shaped" electromagnet 10" with center tap 46 is wired through one transistor utilizing battery 18 for driving the wheel (not shown) in the pull only mode. As usual, reed switch 24 activates the circuit, a relay 52 is wired to a diode 54 which senses the back EMF pulses from "U-shaped" electromagnet 10". A capacitor 56 is wired across the relay coil 52 to smooth out these pulses. A variable resistor 58 provides an effective adjustment for controlling the speed at which the relay will close contacts 60 and shunt "U-shaped" electromagnet 10" to center tap 46. This reduces the inductance and speeds up the drive. A variable resistor 62 is shunt wired across the coil of relay 52. The shunt wiring however is not activated until relay contacts 64 have been activated. This variable resistor sets the speed at which the relay opens back up again to increase the inductance of the "U-shared" electromagnet 10. The speed setting of relay 52 by variable resistor 62 works on the principle that relays typically require more current to close when open than they do to remain closed once activate. The speeds of opening and closing the relay should be sufficiently far enough apart to prevent the annoyance of constant switching back and forth during intermediate velocities. Relay contacts 60 operate in exactly the same manner as switch 48 in FIG. 7.

This drive system can be utilized on other vehicles besides bicycles. FIG. 10 shows the top view of a wheel chair 66 fitted with permanent magnets 4 in wheel 68.

More than one coil can be wound around each electromagnet, allowing the operator to change the inductance by going from parallel to series wiring. This provides an efficient speed control. Also more than one electromagnet can be used per drive wheel. Since this system does not affect either the inner workings of the hub or the pedal drive train normally associated with bicycles, there is no difficulty in driving either the front or rear wheels or both simultaneously and independently of both each other and the pedals.

Drive torque is maximized by having the magnets located as close to the rim as possible. Inertia in the wheel is minimized by keeping all other drive components located on the frame.

As previously mentioned, this system can employ more than one drive electromagnet per wheel. This is advantageous not only because this affords a method of utilizing variable power, but also since several electromagnets can be used with one set of wheel magnets achieving higher power to weight ratios than with a single electromagnet.

The horseshoe electromagnets should be located where their windings can be exposed to the moving air stream around the bicycle so that they can be kept cool. These electromagnets can be cooled more easily in this configuration than in both hub drives and traditional motors. This is important since this keeps the windings cool and running more efficiently. This also increases the amount of power that can be put into the electromagnets, further increasing their power-to-weight ratio. In this system, the permanent magnets run at ambient temperature. This becomes important if rare earth neodymium magnets are to be used since they are particularly temperature sensitive.

Various changes may be resorted to provided they all fall within the spirit and scope of the invention.

In the following portion of the detailed description some fundamental aspects of the electromagnetic propulsion system will initially be reviewed, and then a presently preferred circuit and geometry will be considered.

Figure 11:
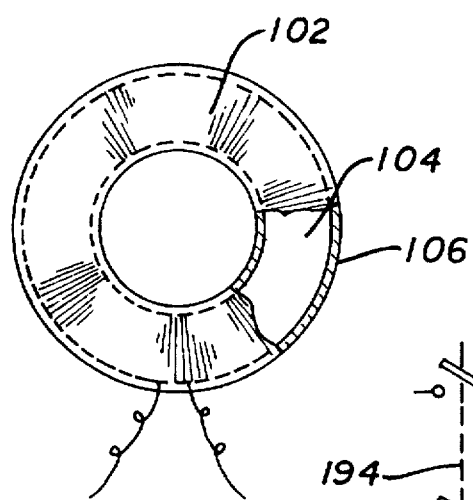
FIG. 11 shows a Rowland ring.

FIG. 11 shows a Rowland Ring 102 named after J. H. Rowland, who made use of this in his work on electricity and magnetism. A Rowland Ring consists of a circular iron core 104 wrapped with wire 106 in a closely spaced torroidal winding. The advantage of a Rowland ring is that the magnetic field within is wholly confined to the core (i.e. virtually no leakage flux away from the core exists). This is important since leakage flux results in decreased efficiencies.

Figure 12:
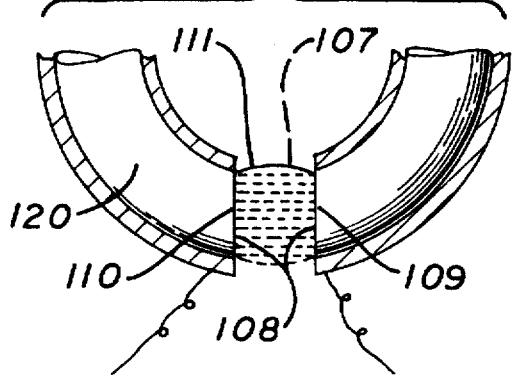
FIG. 12 shows an electromagnet prepared by cutting out a small section of the iron core in a Rowland ring.

FIG. 12 shows a Rowland Ring with a slot cut from the core. At the faces 108 of this slot, lines of induction 107 (also known as magnetic flux) extend across gap 108 when the coil 106 is energized; and magnetic poles 109 and 110 are formed. The magnetic field 107 established in the air gap 111 between poles 109 and 110 of the modified Rowland ring 102 is confined to the area between these poles with a minimum amount of leakage flux present. This construction thus produces a very efficient electromagnet 112 with a naturally long magnetic core length and virtually no lost leakage flux at the air gap 111.

Figure 13:
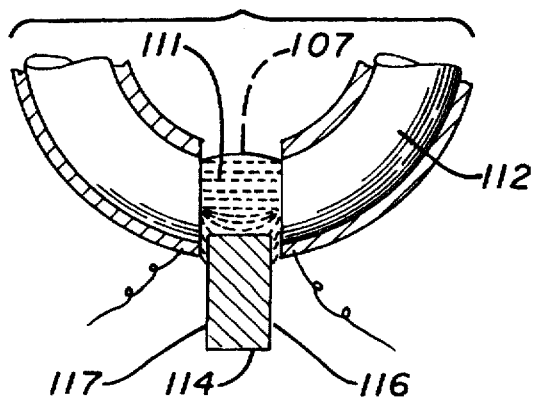
FIG. 13 shows the electromagnet of FIG. 2 pulling a permanent magnet into its field.

FIG. 13 shows electromagnet 112 interacting with a permanent magnet 114 having pole faces 116 and 117 of substantially the same dimensions as those of electromagnet 112. The direction of magnetization of permanent magnet 114 is along its length from one pole to the other and thus is in the same direction as the flux 107 in air gap 111 of electromagnet 112. The length of permanent magnet 114 in its direction of magnetization is but slightly less than is the length of the air gap 111 of electromagnet 112 along its direction of magnetization. This allows a small clearance between the pole faces of electromagnet 112 and the pole faces of permanent magnet 114. When permanent magnet 114 is in air gap 111 of electromagnet 112, a perfectly magnetically balanced circuit results with virtually no lost leakage flux.

FIG. 14 shows the magnetic circuit resulting from permanent magnet 114 located in air gap 111 of electromagnet 112 in its equilibrium neutral position. When windings 106 of electromagnet 112 are electrically energized, magnetic flux 107 is generated and easily travels through iron core 104 to pole faces 109 and 110. The lines of magnetic flux 107 then cross what little remains of air gap 111 to pole faces 116 and 117 of permanent magnet 114 to complete the magnetic circuit.

FIG. 15 shows a Rowland ring with a slot where the shape of the core 120 has been modified in order to form magnetic poles 121 and 122 of rectangular shape.

FIG. 16 shows a Rowland ring with a slot where the shape of the core 124 has been modified such that it has outside dimensions that are rectangular in shape in order to allow for easy mounting onto a bicycle frame.

FIG. 17 shows a bicycle 30 constructed with permanent magnets 114 mounted between the spokes and onto the rim 128 of the drive wheel (front wheel in this diagram) 132. Located on frame 126 of bicycle 130 are mounted several electromagnets 112 which straddle wheel 132 having poles 109 and 110 coming close to but not touching the poles of permanent magnets 114 in rim 128 of wheel 132. Further employed is at least one sensor 134 which could be a reed switch, a Hall effect sensor, a photocell gate, or any other means to sense the positions of the permanent magnets 114 in wheel 132 relative to electromagnets 112 on frame 126. The sensor is interfaced via a semi-conductor circuit 134 to a set of batteries 136. A switch 138 in series with the batteries activates the drive mechanism. FIG. 18 shows a cut away view of magnet 114 in rim 128 of the wheel 132 being driven by "modified Rowland ring" electromagnet 112. The pull cycle is illustrated by virtue of permanent magnet poles 116 and 117 being opposite in polarity to the "modified Rowland ring" electromagnet poles 109 and 110.

Figures 19, 22:
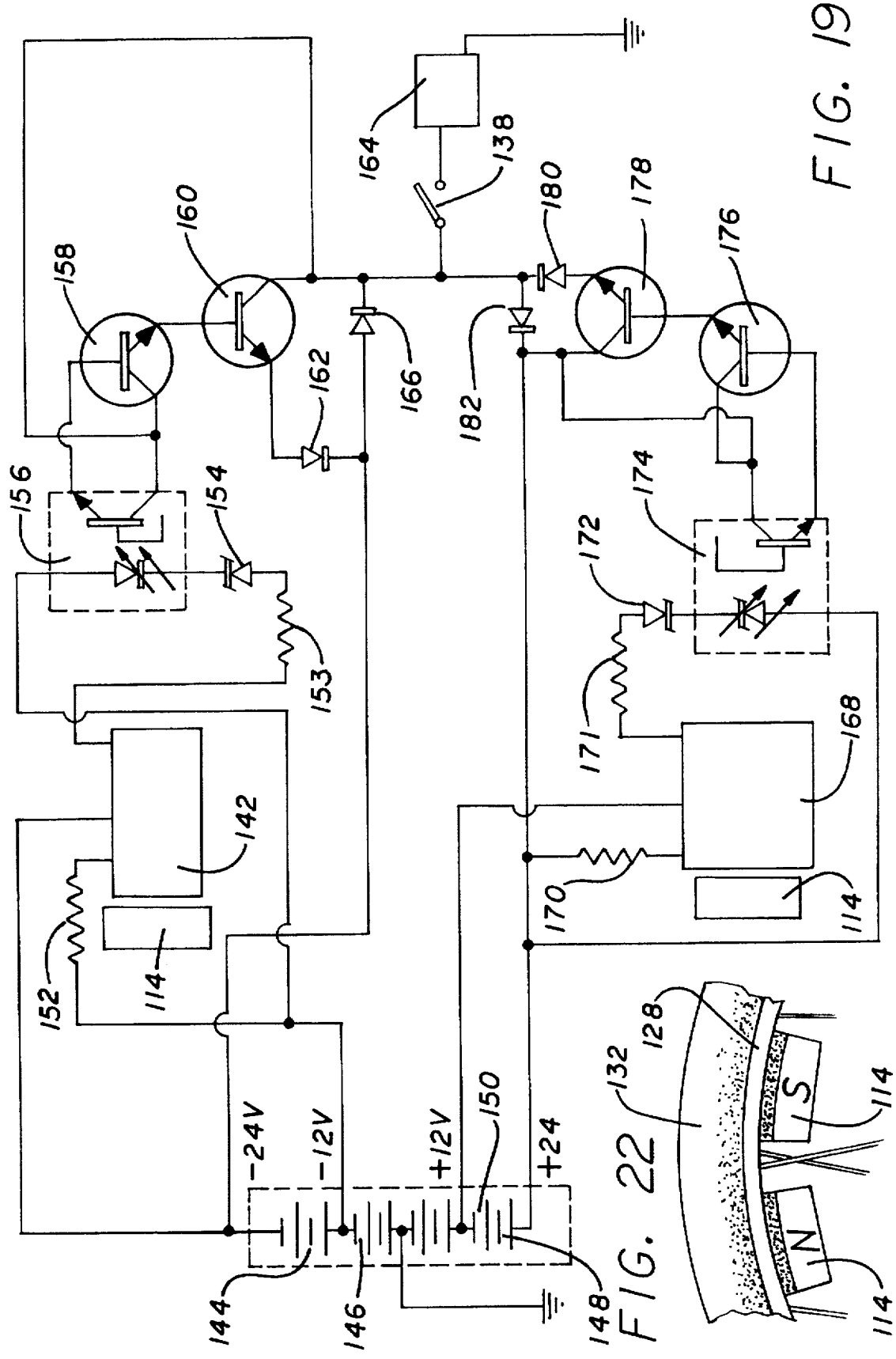
FIG. 19 shows a schematic circuit diagram for driving the electric bicycle of this invention.
FIG. 22 is a partial side view of two adjacent permanent magnets mounted on a bicycle wheel.

FIG. 19 shows a circuit diagram for properly timing and supplying power to the electromagnets of this invention in order to drive the bicycle. The circuit serves to initially energize the coil of electromagnet 164 in one direction to pull an adjacent permanent magnet into the field of the electromagnet, and then reverses the energization applied to coil 164, to push the permanent magnet out of the electromagnet 164 and to pull the next permanent magnet forward. When permanent magnet 114 passes by Hall effect sensor 142, power from battery 144 flows through resistors 152 and 153 and zener diode 154 to activate opto-isolator 156. The phototransistor portion of opto-isolator 156 is wired directly to transistor 158 which is wired directly to power transistor 160. Thus, when Hall effect sensor 142 is activated by permanent magnet 114, transistor 160 is turned on with full power. Power from batteries 144 and 146 is then delivered to electromagnet 164 through diode 162. Electromagnet 164 moves the wheel forward by pulling permanent magnet 114 into its field. When permanent magnet 114 approaches its equilibrium position, Hall effect sensor 142 is shut off. The unused magnetic energy stored in the electromagnet shows up as a reverse EMF spike. Diode 162 isolates transistor 160 from this spike. Diode 166 then shunts this spike into batteries 148 and 150 to give them a slight charge. Permanent magnet 114 then passes by Hall effect sensor 168, switching power from battery 148 through resistors 170 and 171 and zener diode 172 to activate opto-isolator 174. The phototransistor portion of opto-isolator 174 is wired directly to transistor 176 which in turn is wired directly to power transistor 178. Thus when Hall effect sensor 168 is activated by permanent magnet 114, transistor 178 is turned on with full power. Power from batteries 148 and 150 is then delivered to electromagnet 164 through diode 180, in the opposite direction from that supplied through transistor 160. Electromagnet 164 moves the wheel forward by pushing permanent magnet 114 out of its field, and pulling the next successive permanent magnet into the field. Once permanent magnet 114 has been sufficiently moved out of the field of electromagnet 164, Hall effect sensor 168 then shuts off power to the circuit. Stored magnetic energy left in electromagnet 164 shows up as a back EMF spike which is isolated from transistor 178 by diode 180 and is shunted across diode 182 into batteries 144 and 146 thus completing the cycle.

Figure 20:
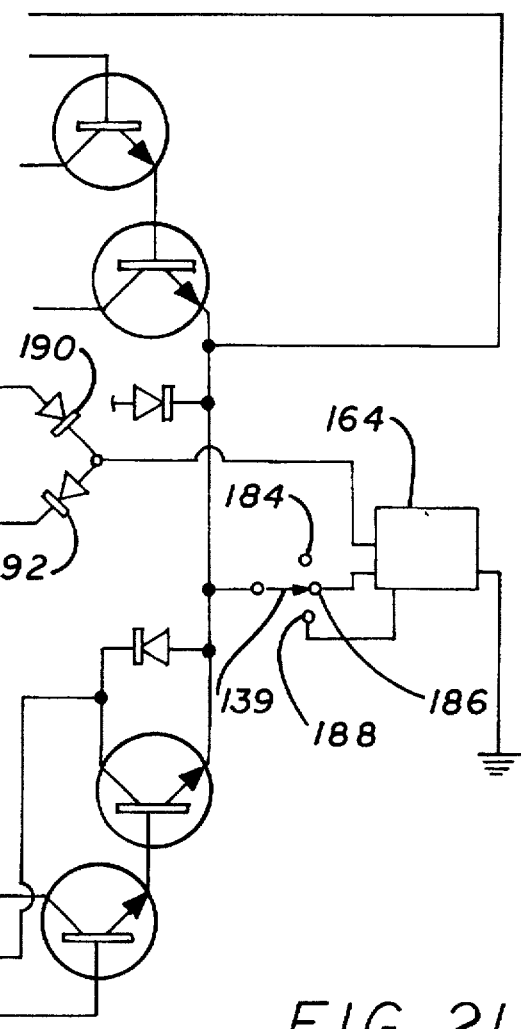
FIG. 20 shows a schematic circuit diagram for driving the bicycle of this invention at various speeds by providing the electromagnets with center taps, and using DPST switches to switch from one tap to the other.

FIG. 20 shows the drive portion of circuit 109 with added switching arrangements for selecting the speed. When switch 139 is closed to contact 184, electromagnet 164' is turned off. When switch 139 is closed to contact 186, the entire coil length of electromagnet 164' is activated for low speed drive. When switch 139 is closed to contact 188, several turns of wire in electromagnet 164' are shunted. This results in a decrease in the overall inductance of electromagnet 164' resulting in an increase in wheel speed.

Also shown in FIG. 20 are diodes 190 and 192 as well as DPST double pole single throw switch 194. When switch 139 is opened by switching to open circuit contact 184, electromagnet 164' is isolated from all of the drive circuitry. Closing DPST switch 194 connects electromagnet 164 through diodes 190 and 192 directly into batteries 144, 146, 148 and 150 of FIG. 9. This allows AC power generated in electromagnet 164 to recharge the batteries when going down hills. The circuit of FIG. 20 may of course be substituted into the right hand side of the circuit of FIG. 19 with power transistors 160' and 178' of FIG. 20 corresponding to transistors 160 and 178 of FIG. 19.

Figure 21:
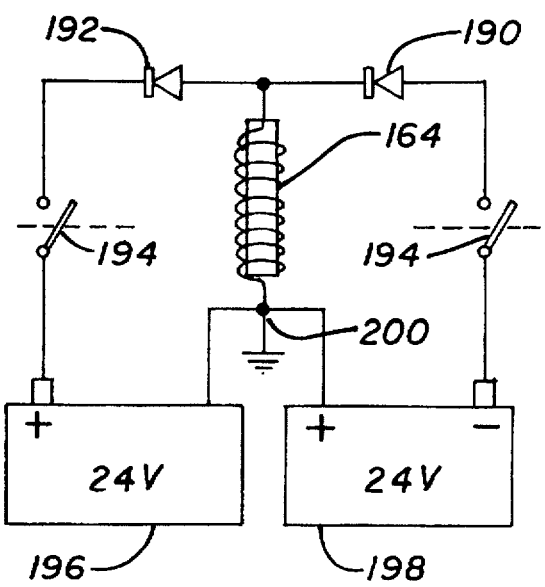
FIG. 21 shows a schematic circuit diagram which allows the drive system to be used as a generator for recharging the batteries when going down hill.

FIG. 21 shows a simplified circuit diagram for using a drive electromagnet of this invention to charge the batteries when going down hills. When SPDT switch 194' is closed, AC power is applied from electromagnet 164" through diodes 190' and 192' to charge batteries 196 and 198. Battery 196 in FIG. 21 is equivalent to batteries 148 and 150 in series shown in FIG. 19. The ground connection 200 of electromagnet 164" is the common connection between batteries 196 and 198. The circuit of FIG. 21 may be substituted into and added to the circuit of FIG. 19.

FIG. 22 is a partial side view of a pair of magnets 114 mounted on the rim 128, on which the wheel 132 is mounted. Epoxy impregnated felt spacers mount the magnets to the rim. Note that the adjacent magnets 114 are oppositely magnetized.

A specific example of one system constructed and tested by me will now be set forth.

The center portion of a transformer having outside core dimensions of 4.0"×4.5", inside core dimensions of 2.5"× 3"1, and a stacking layer thickness of 1.5", was removed. The modified core resembled a rectangle having outside dimensions of 4.0"×4.5" a wall thickness of 0.75", and consisted of enough stacked laminates to give an overall thickness of 1.5". The four edges in the thickness dimension were arc welded with mild steel, and a section, 0.85" in length was cut out from the center of one of the 4.0" long outside ends. This cut out area constitutes the air gap. The remainder of the core was then wrapped with two layers of friction tape. 21 gauge enameled electromagnet wire was wrapped around the remaining portion of the core. The free end of the wire used to start the winding was labeled "common". After a single layer, a first tap was connected and labeled "low inductance". One more layer of wire was wrapped around the core and the free end labeled "high inductance". A 12 volt DC power supply was wired across the low inductance portion of the coil. A current of 8 amperes flowed indicating a resistance of 1.5 ohms. The power supply was then wired across the entire coil length. A current of 4 amperes flowed indicating a resistance of 3.0 ohms for the high inductance tap.

A front aluminum bicycle wheel of 17 millimeter rim width was fitted with 36 permanent magnets (material specification "ceramic 8") having the following dimensions 0.75" thick, 1.0" high, and 1.5" in length. The direction of magnetization was through the thickness as shown in FIG. 4. Epoxy impregnated felt was used to fasten the magnets to the rim with the poles flush with the sides of the rim, and the height pointing radially inward toward the hub. These were placed between every spoke with their poles reversed with each successive magnet all of the way around the wheel.

During testing, a front bicycle fork was mounted upside down into the top of a heavy wooden box. ¼" thick plastic spacers were taped onto narrow dimension of the electromagnet on one side to magnetically isolate the electromagnet from the steel fork. The electromagnet and its plastic spacers were mounted to a front bicycle fork using several bar-loc cable ties with the slot in the electromagnet facing toward the end of the prongs of the fork. The wheel assembly containing the permanent magnets was then slid into and mounted on the fork assembly, so that the electromagnet slid over the wheel until the permanent magnets in the rim traveled through the slot in the electromagnet when the wheel was rotated. The electromagnet was then clamped firmly in place with more bar-loc cable ties. Two unipolar Hall effect sensors with Schmidt triggering circuitry (Panasonic 6852) were mounted to a 1"×3" piece of 0.25" thick plexiglass with their centers 1.875" apart. This assembly was then mounted to the fork using a clamp from a bicycle generator set. A slot was cut into the plexiglass fixture to allow it to be moved along the direction of wheel rotation for the purposes of timing adjustment. The Hall effect sensors and electromagnet were wired to circuitry and batteries in accordance with FIG. 19. The following components were used. Hall effect sensors 142 and 168 were panasonic 6852 unipolar Hall effect sensors with built in Schmidt triggering circuitry. Resistors 153 and 171 had a value of 2,750 ohms. Resistors 152 and 170 had a value of 375 ohms. Diodes 154 and 172 were 6 volt zener diodes. Optoisolators 156 and 174 were TIL-154 equivalent to ECG3041. Transistors 158 and 176 were tip 110 Darlington NPN bipolar transistors and power transistors 160 and 178 were type 2N3773. Diodes 162, 166, 180 and 182 were rated at 400 volts and 6 amperes. Batteries 144, 146, 148 and 150 were all 12 volt 7 ampere hour capacity sealed lead acid cells.

The circuitry was all wired into place with the exception of the power connection to the electromagnet. The circuit timing was set for equilibrium neutral position by moving the Hall effect sensors along the direction of motion of the wheel until power was shut off just when the permanent magnet was centered in the electromagnet gap.

The high inductance electromagnet lead was connected to power by closing SPDT switch 138. The wheel was then moved forward slightly by hand. The wheel promptly accelerated to five revolutions per second. The high inductance side of the electromagnet was disconnected from power, and the low inductance side connected. This time the wheel accelerated to ten revolutions per second. The timing was advanced by moving the Hall effect sensors backwards to turn on the electromagnet slightly early. This caused the speed to increase further.

Referring again to FIG. 17, the electromagnets 112 are spaced around the wheel, with the same spacing as the permanent magnets. The electromagnets 112 may be energized in parallel, and are wired together so that the polarity of the first and third electromagnets are the same, with the second and fourth electromagnets being wired to provide opposite polarity. If desired, more or less electromagnets may be employed.

The foregoing detailed description relates to preferred embodiments of the invention. It is to be understood, however, that the invention is not limited to the arrangements precisely as shown and described hereinabove. Thus, by way of example and not of limitation, a greater or lesser number of electromagnets and permanent magnets may be used. Different electrical circuitry may be employed to provide the same functions as described herein. Accordingly, the present invention is not limited to the precise embodiments disclosed herein.

What is claim is:

1. An electrically powered vehicle having a frame, and front and rear wheels, each of said wheels having a central axis of rotation, first and second sides and a rim and spokes, said vehicle further comprising:

a plurality of successive permanent magnets mounted successively on said rim of one of said wheels between said spokes, the direction of polarization of the magnetization of said magnets being aligned with said axis, and with successive magnets being polarized oppositely, said permanent magnets having oppositely polarized first and second end faces;

a U-shaped electromagnet mounted on the frame of said vehicle, straddling the wheel on which said magnets are mounted, and said electromagnet having first and second pole faces, said first face being inn close coupling proximity to a first face of each of said permanent magnets as said wheel rotates, on said first side of said wheel, and the said second face of said electromagnet being in close coupling proximity to the second face of each of said permanent magnets on said second side of said wheel;

said U-shaped electromagnet having a continuous core of magnetic material extending from said first pole face on one side of said wheel to said second pole face on the other side of said wheel; and said electromagnet including at least one coil extending around said core of magnetic material;

a battery;

a permanent magnet position sensing device; and circuitry operated in response to said position sensing device for applying pulses of current from said battery to said electromagnet to provide a magnetic field to interact with said permanent magnets to rotate said wheel.

2. An electrically powered vehicle as defined in claim 1 further comprising a power transistor circuit for supplying current to the electromagnet from the battery in response to signals from said wheel position sensing device.

3. An electrically powered vehicle as defined in claim 1 wherein said sensing device is a reed switch.

4. An electrically powered vehicle as defined in claim 1 wherein said sensing device is a Hall effect sensor.

5. An electrically powered vehicle as defined in claim 1 wherein said sensing device is a photocell gate.

6. An electrically powered vehicle as defined in claim 1 wherein said vehicle is a bicycle.

7. An electrically powered vehicle as defined in claim 1 wherein said vehicle is a wheelchair.

8. An electrically powered vehicle as defined in claim 1 wherein said electromagnet has a plurality of windings.

9. A vehicle as defined in claim 1 with added circuitry coupled between said electromagnet and said battery for recharging the battery when going down hills.

10. An Electrically powered bicycle having a frame, and front and rear wheels, each of said wheels having a central axis of rotation, and a rim and spokes, each of said wheels having one side and an other side, said vehicle further comprising:

a plurality of successive permanent magnets mounted on said rim of one of said wheels between said spokes, and with successive magnets being polarized oppositely, and each of said permanent magnets having first and second oppositely polarized end faces facing outwardly toward opposite sides of said one of said wheels;

a U-shaped electromagnet mounted on the frame of said bicycle, straddling the wheel on which said magnets are mounted, and said electromagnet having first and second pole faces, said first face of said electromagnet being in close proximity to said first face of each of said permanent magnets as said wheel rotates, on said one side of said wheel, and said second face of said electromagnet being in close coupling proximity to said second face of each of said permanent magnets on said other side of said wheel;

said U-shaped electromagnet having a continuous core of magnetic material extending from said first pole face on one side of said wheel to said second pole face on the other side of said wheel; and said electromagnet including at least one coil extending around said core of magnetic material;

a battery;

a permanent magnet position sensing device; and circuitry operated in response to said position sensing device for applying pulses of current from said battery to said electromagnet to provide a magnetic field to interact with said permanent magnets to rotate said wheel.

11. An electrically powered vehicle as defined in claim 10 further comprising a power transistor circuit for supplying current to the electromagnet from the battery in response to signals from said wheel position sensing device.

12. An electrically powered vehicle as defined in claim 10 wherein aid sensing device is a reed switch.

13. An electrically powered vehicle as defined in claim 10 wherein said sensing device is a photocell gate.

14. An electrically powered vehicle having a frame, and front and rear wheels, each of said wheels having a central axis of rotation, and a rim, each of said wheels having one side and an other side, said vehicle further comprising:

a plurality of permanent magnets mounted on said rim of one of said wheels on said rim, and said permanent magnets having oppositely polarized end faces;

a generally U-shaped electromagnet mounted on the frame of said bicycle, straddling the wheel on which said magnets are mounted, and said electromagnet having first and second pole faces, said first pole face being in close coupling proximity to said permanent magnets as said wheel rotates, on one side of said wheel, and said second pole face of said electromagnet being in close coupling proximity to each of said permanent magnets on the other side of said wheel;

a battery;

a permanent magnet position sensing device; and circuitry for applying pulses of current from said battery to said electromagnet to provide a magnetic field to interact with said permanent magnets to rotate said wheel.

15. An electrically powered vehicle as defined in claim 14 wherein said sensing device is a Hall effect sensor.

16. An electrically powered vehicle as defined in claim 14 wherein said electromagnet has a magnetic core extending substantially from said first pole face to said second pole face of said electromagnet.

17. An electrically powered bicycle capable of propelling itself and rider without the need for pedalling, said bicycle including a frame comprising:

a plurality of wheels with spokes for mounting the rim of the wheel to the hub thereof; permanent magnets mounted on the rim of one of said wheels between said spokes with their polarity alternating all of the way around the wheel, and their pole faces on each side of the rim;

at least one electromagnet with a minimum core length of 8 inches, said electromagnet including a torroidal winding of wire on an iron core with a slot, and which is mounted on the frame, with the tire and rim assembly traveling through the center portion of the electromagnet and having the pole faces of said electromagnet extending to two sides of the wheel in alignment with the pole faces of the permanent magnets in the rim;

said electromagnet having first and second pole faces and having a continuous core of magnetic material extending from said first pole face on one side of said wheel to said second pole face on the other side of said wheel; and said electromagnet including at least one coil extending around said core of magnetic material;

a battery;

circuitry for coupling said electromagnet to said battery; and switches included in said circuitry for sensing the position of said magnet relative to said coil and for applying a magnetic field to said permanent magnet from said electromagnet to drive said bicycle.

18. A vehicle as defined in claim 17 which employs a center tap on the electromagnets and a SPDT switch coupled between said battery and said electromagnet to allow the operator of said vehicle to change the speed.

19. A vehicle as defined in claim 17 wherein the outside dimensions of the electromagnet are substantially rectangular in order to facilitate mounting to the frame.

20. A vehicle as defined in claim 17 including at least one additional electromagnet as defined in claim 17, mounted on said frame; the spacing of said electromagnets on said frame being coordinated with the spacing between said permanent magnets.

21. An electrically powered vehicle having a frame and front and rear wheels, each of said wheels having a central axis of rotation, first and second sides and a rim and spokes, said vehicle further comprising:

a plurality of successive permanent magnets mounted successively on said rim of one of said wheels between said spokes, the direction of polarization of the magnetization of said magnets being aligned with said axis, and with successive magnets being polarized oppositely, said permanent magnets having oppositely polarized first and second end faces;

a U-shaped electromagnet mounted on the frame of said vehicle, straddling the wheel on which said magnets are mounted, and said electromagnet having first and second pole faces, said first face being in close coupling proximity to a first face of each of said permanent magnets as said wheel rotates, on said first side of said wheel, and the said second face of said electromagnet being in close coupling proximity to the second face of each of said permanent magnets on said second side of said wheel;

a battery;

a permanent magnet position sensing device;

circuitry operated in response to said position sensing device for applying pulses of current from said battery to said electromagnet to provide a magnetic field to interact with said permanent magnets to rotate said wheel;

said electromagnet having a plurality of windings; and
circuitry for selectively switching said windings between a series and a parallel configuration.

* * * * *